United States Patent [19]

Chang et al.

[11] Patent Number: 5,292,706
[45] Date of Patent: Mar. 8, 1994

[54] PREPARING CARBON MOLECULAR SIEVES OF INCREASED DENSITY

[75] Inventors: Chin-Hsiung Chang, Palatine; Li Wang, Bloomingdale; Mark Kaiser, Brookfield, all of Ill.

[73] Assignee: Allied-Signal Inc., Morris Township, Morris County, N.J.

[21] Appl. No.: 964,174

[22] Filed: Oct. 21, 1992

Related U.S. Application Data

[63] Continuation-in-part of Ser. No. 906,995, Jul. 1, 1992.

[51] Int. Cl.$^5$ .................. C01B 31/02; C01B 31/08; B01J 20/30; B01J 20/20
[52] U.S. Cl. ........................ 502/418; 95/143; 502/416; 502/437; 502/526
[58] Field of Search .............. 502/416, 417, 418, 420, 502/433, 437, 436, 180

[56] References Cited

U.S. PATENT DOCUMENTS

| 4,820,318 | 4/1989 | Chang et al. | 55/68 |
| 4,820,681 | 4/1989 | Chang et al. | 502/437 |
| 4,902,312 | 2/1990 | Chang | 55/71 |
| 5,063,042 | 11/1991 | Arita et al. | 502/180 |
| 5,071,820 | 12/1991 | Quinn et al. | 502/434 |

OTHER PUBLICATIONS

Matranga et al., Chem. Eng. Sci. vol. 47, No. 7, pp. 1569–1579.

*Primary Examiner*—Paul E. Konopka
*Attorney, Agent, or Firm*—Harold N. Wells; Gerhard H. Fuchs; Mary Jo Boldingh

[57] ABSTRACT

Natural gas is stored in a closed vessel under a pressure of about 1400 to 4500 kPa using a carbon molecular sieve adsorbent. The deliverable volume of natural gas from a vessel packed with carbon molecular sieve particles is increased by impregnating a polymer precursor of the carbon molecular sieve with additional monomers and polymerizing the monomers before carbonizing the precursor.

4 Claims, No Drawings

PREPARING CARBON MOLECULAR SIEVES OF INCREASED DENSITY

CROSS-REFERENCE TO RELATED APPLICATION

This is a continuation-in-part of U.S. Ser. No. 07/906,995, filed Jul. 1, 1992.

BACKGROUND OF THE INVENTION

This invention relates to a method of storing natural gas. More particularly, the invention relates to storage of natural gas at near ambient temperatures using a solid adsorbent, in particular, a carbon molecular sieve.

In U.S. Pat. No. 4,820,681 one of the present inventors has disclosed an improved carbon molecular sieve which has a high capacity for carbon dioxide and may be characterized as hydrophobic, requires no binders, and may be carbonized in a single step.

Natural gas, being substantially methane, has a low molecular weight and it occupies a large volume per unit weight compared to liquid fuels. Thus, reducing the volume of natural gas is necessary for most practical applications of natural gas as a fuel. Methods for doing this could include (1) storage at high pressure, (2) liquefaction and storage at low temperatures, and (3) adsorption on solids. Of these methods the last is of particular interest since compact storage of natural gas at moderate pressures may be achieved, while avoiding the cryogenic temperatures needed for liquid natural gas or the high pressures needed for storage as a gas in reasonable volumes.

Conventional activated carbons have been found to have reasonable capacity for natural gas but higher capacity is believed necessary for commercial success. Inorganic zeolites have also been tried, but found to have relatively low capacity for natural gas. Carbon molecular sieves also have been suggested for adsorption of natural gas. Improvements in the storage of natural gas have been disclosed in copending application U.S. Ser. No. 07/906,995.

In this continuation-in-part the inventors will disclose a method for increasing the packing density of carbon molecular sieves and thereby increasing the volumetric efficiency of the adsorption of natural gas.

BRIEF SUMMARY OF THE INVENTION

Natural gas is stored at near ambient temperatures and at pressures of about 100–900 psig (791 to 6305 kPa abs.) on a carbon molecular sieve having a capacity for said natural gas greater than 0.095 grams per gram of carbon at 300 psig (2,169 kPa abs.) preferably greater than 0.13 grams per gram of carbon. Preferably, the pressure is about 200–600 psig (1479 to 4234 kPa abs.) and the temperature is about 10° to 50° C. The carbon molecular sieves are particles characterized by having at least 60% of the total particle pore volume, preferably at least 75% consisting of micropores having diameters greater than 4 Å (0.4 nm) and less than 20 Å (2 nm). Typically, as initially formed the micropores have diameters substantially between 5 and 7 Å (0.5 and 0.7 nm) and have a slitlike shape. Larger pores may be created by an activation step. The carbon particles preferably are shaped as spheres, as cylinders having an aspect ratio of about 1/1, or as flat disks.

The carbon molecular sieve is derived from carbonization in an inert atmosphere of an oxygen-free polymer, preferably vinylidene chloride. The carbonized polymer may be activated by heating in an atmosphere containing steam, carbon dioxide, or oxygen to optimize the pore size and to increase the micropore volume and thereby optimize the deliverable volume of natural gas. Preferably, the activation is carried out in an inert atmosphere containing an effective amount of $CO_2$ at a temperature of at least 750° C.

The density of the carbon molecular sieve is increased according to the invention by impregnating the polymer precursor of the carbon molecular sieve with monomer, polymerizing the monomer, and repeating the process until the desired density is achieved. This may be up to about 125% of the initial polymer density. After carbonization, the densified polymer yields a more dense carbon molecular sieve, which provides increased packing density and greater deliverable capacity for natural gas.

DETAILED DESCRIPTION OF THE INVENTION

Natural Gas Storage

An important potential use for natural gas is a fuel for vehicles. It will be evident that the size and weight of the fuel tanks for such vehicles will be an important consideration. Conventional gasoline tanks provide efficient energy storage. However, storing natural gas efficiently is more difficult. The tanks must hold enough natural gas to provide an acceptable operating range and still not occupy too much space or add too much weight to the vehicle. Liquified natural gas occupies the least space, but requires a temperature of about −162° C., which is too low to be considered for most applications. High pressure natural gas, say in the range of 2000 psig (13.9 MPa abs.) to 3600 psig (25 MPa abs.), is feasible but the high pressures require heavy and expensive vessels which can be fueled only from rather expensive equipment. It is unlikely that such high pressure would be acceptable or feasible except for a captive fleet of short range vehicles which could be fueled at a central location. Lower pressures of about 300 psig (2,169 kPa abs.) to 900 psig (6,305 kPa abs.) are considered to present an optimum choice for natural gas fueled vehicles.

It has been shown that adsorbents may be useful for low pressure storage of natural gas and carbons have been found to have higher capacities for natural gas than other solid adsorbents such as zeolites, silica gel, and alumina. Even so, not all carbons have adequate capacity to meet the standards considered necessary for practical applications. As will be seen, the carbon molecular sieves of the present invention are superior to others and provide a higher capacity for natural gas. Another advantage for carbon compared to other adsorbents is its lower tendency to adsorb impurities in the natural gas which could decrease the storage capacity for the natural gas. Since the carbon molecular sieves of the invention are typically hydrophobic, they avoid loss of capacity resulting from adsorption of water as well as adsorption of $CO_2$ or other impurities.

Natural gas will be stored in the pores of the carbon and in spaces around the carbon particles. The optimum pore size for natural gas adsorption is believed to be about 4 to 12 Å (0.4 to 1.2 nm) since the pores do not just hold compressed gas, but cause the gas molecules to behave as if more highly compressed, that is, to have a higher density than the gas normally has at the storage pressure. Thus, it follows that the volume of such micropores in a carbon particle should be as large as possible to maximize gas storage. Gas in the void spaces around the carbon would be expected to have its normal density and therefore, these spaces should be minimized. Thus, the carbon should have the highest possible packing density. Another factor to be considered is the need to provide for access to the carbon so that the natural gas can be efficiently stored and recovered. For that purpose larger pores are believed to be needed, say about 20 to 500 Å (2 to 50 nm). These have been termed meso pores. Larger pores, i.e. above 500 Å (50 nm) are considered macro pores. In a vessel packed with carbon molecular sieve particles, natural gas can be stored in the micropores, the meso and macro pores, and in the void volume. Preferably the largest possible fraction of the volume should be in the micropores.

Carbon Molecular Sieves (CMS)

The carbon molecular sieves and activated carbons made by prior art methods using waste materials from the manufacture of Saran or other low cost feedstocks are considered inferior to the adsorbent of the present invention for the storage of natural gas since they have not been optimized for the desired properties.

Hydrophobic carbon molecular sieves (CMS) for the adsorption of natural gas are produced by a unique method. This method comprises three steps: (1) polymerization of an oxygen-free monomer optionally but not preferably in the presence of a minor amount of an oxygen-free cross-linking agent; (2) forming particles of the resultant polymer into a desired shape; and then, (3) carbonizing the shaped material in a substantially oxygen-free environment, which may include carbon dioxide in one embodiment of the invention.

The monomers should be readily polymerizable, essentially free of oxygen in their molecular structure and preferably consisting of hydrogen, a halogen, and carbon. Among the materials which may be employed as the monomer are acrylonitrile (AN), vinylidene fluoride (VDF), chlorotrifluoroethylene (HALAR), vinylidene chloride (VDC), mixtures of two or more monomers such as mixtures of vinylidene chloride and vinyl chloride, vinylidene chloride and acrylonitrile, and a mixture of styrene and divinylbenzene. Other monomers include vinyl fluoride, vinyl bromide, chlorinated ethylene, chlorofluoroethylene, vinyl chlorobenzene, vinylidene bromide and vinylidene-fluoride-chlorotrifluoro-ethylene. The preferred monomer is vinylidene chloride, most preferably alone, i.e. without a cross-linking agent.

Several methods of polymerization may be employed. Bulk polymerization is the direct conversion of liquid monomer to polymer in a reaction system in which the polymer remains soluble in its own monomer. Solution polymerization uses a solvent capable of dissolving the monomer, the polymer, and the polymerization initiator. Suspension polymerization and emulsion polymerization have also been used to produce materials having the same level of desired properties, contrary to the previous findings of U.S. Pat. No. 4,820,681. In suspension polymerization, the monomer is dispersed rather than dissolved in the medium, with water being a typical suspension medium. In emulsion polymerization, a suspended particle of colloidal size will be the site of the polymerization. The initiator is dissolved in the monomer, the monomer is dispersed in water, and a dispersing agent is incorporated to stabilize the suspension formed. Precipitation polymerization and vapor phase polymerization may also be suitable.

The polymers produced in the initial polymerization step optionally may be cross-linked with a substantially oxygen-free cross-linking agent. The cross-linking agent will typically be present during the polymerization at a concentration equal to less than 10 mole percent of the monomer preferably less than 5 mol. %, and most preferably less than 1 mol. %. A preferred cross-linking agent is divinylbenzene. Other possible cross-linking agents include trivinyl benzene, divinyl acetylene, and divinyl sulfide.

As the production of carbon molecular sieves from polymers containing no oxygen is desired, the polymerization initiator is also preferably an oxygen-free compound. Therefore, a carbon or az rather than an oxygen initiator is preferably used. One suitable non-oxygen containing initiator is 2,2'-azobis(isobutyronitrile), (AIBN). Another suitable polymerization initiator is the compound 2,2'-azobis (2,4polymerization initiator is the compound 2,2'-azobis (2,4-dimethylvaleronitrile) which is available from DuPont Chemical Company and is sold under the trade VAZO 52.

If the precursor polymer is produced by solution polymerization, a number of different solvents may be employed. Typical solvents include normal hexane, chloroform, carbon tetrachloride, orthodichlorobenzene, and 1,1,2,2-tetrachloroethane. Of these materials, orthodichlorobenzene and 1,1,2,2-tetrachloroethane are preferred. General characteristics for the selection of a solvent include a high-solubility for the monomer, the absence of oxygen in the molecular structure, and a large difference in boiling point between the solvent and the monomer. A weight ratio between monomer and solvent between 1:1 to 1:2 will normally be suitable.

When suspension or emulsion polymerization is used, the monomer is usually suspended or emulsified in water. The ratio of the monomer to the suspending fluid is about 0.1–1 to 1. A suspending agent, such as hydroxypropyl methyl cellulose is added in amounts of about 0.1 to 2%. Related compounds may also be used such as poly vinyl alcohol and Polyox (WRPA 3154) from Union Carbide.

For ease in fabricating the polymer into a desired shape, it is preferably reduced in size to small free-flowing particles, which may be shaped into a desired configuration by conventional means. A preferred form is a cylindrical pellet having an aspect ratio (diameter-×height) of about 1/1. When suspension polymerization is used, the polymer is produced as spherical particles which may not require additional shaping.

Improvements to the capacity of carbon molecular sieves may include increased packing density, i.e. g/mL. For a given porosity the more carbon which can be packed into a given volume the greater the amount of natural gas which can be adsorbed. Increased packing density can be achieved by interspersing small particles in the spaces between larger particles, as discussed in co-pending patent application U.S. Ser. No. 07/906,993. A convenient source of such small particles is the spherical polymer beads produced by suspension polymerization. These beads are carbonized and used to increase packing density. However, since they are not compressed into pellets they are less dense. We have found that the density can be increased by impregnation of additional monomer and polymerization initiator into the polymer, then polymerizing the added monomer and repeating the procedure until the desired density is obtained. An increase of up to about 125% of the original polymer density can be obtained. After carbonization, this increased density is retained in the carbon molecular sieve and significantly improves the capacity for natural gas.

The polymeric material is carbonized by heating to a high temperature in the presence of an inert gas such as nitrogen or helium. As will be discussed below, the addition of carbon dioxide will have the effect of increasing the average pore size of the resulting carbon. The concentration of oxygen in the atmosphere surrounding the particles undergoing carbonization should be less than 0.1 mole percent and is preferably less than 0.05 mole percent. The carbonization will result in the evolution of a hydrogen halide. Preferably the inert gas should be flowing at a sufficient rate to remove this material from the particles. It is preferred that prior to high temperature carbonization the polymer be heated slowly in the range of 140°-180° C. (preferably about 2° to 10° C./hr) and held at this temperature for several hours. The polymer is then preferably subjected to a programmed temperature increase to a temperature above 700° C. The temperature is preferably raised at a rate greater than 50° C. per hour but less than 200° C. per hour. It is preferred to hold the final temperature for a period of at least 45 minutes and preferably for at least one hour. A preferred rate of programmed heating is 75°-125° C. per hour. The highest temperature is normally required for less than 5 hours. The required holding period can be determined by weight loss measurements.

Only a single carbonization step is needed. The second carbonization step of some prior art methods is not required. The second carbonization step of the prior art is done after the product of the first carbonization has been pulverized, admixed with a binder or other material such as coal tar pitch or high carbon content material and then shaped again.

Since the sieve precursors are derived from polymeric materials and include no binders, they are substantially free of the inorganic materials such as metals and inorganic oxides which may be present when the precursor material is made from a naturally occurring substance such as coal, coconut shells, peat, or wood. Materials which contain a binder will normally have impurities derived from the binder in addition to impurities present in the precursor materials. After carbonization on a hydrogen- and oxygen-free basis, the product should contain at least 99.5 wt. % carbon and preferably at least 99.8 wt. % carbon. This measurement does not include any material applied as a surface treatment or coating.

The polymeric material will shrink during the carbonization step in a proportional manner along each dimension. The amount of shrinkage is also proportional to the amount of weight loss caused by the driving off of the hydrogen halide from the shaped polymer. A cylindrical pellet will lose approximately 70 percent of its weight and size during the carbonization procedure due to the evolution of hydrogen chloride, hydrogen bromide, or hydrogen fluoride or a mixture of these gases. For PVDC-based precursors, the final carbonized material will often equal about 25 to 28 weight percent of the initial or starting polymerized material. The density of the initial material and the final carbonized material are related. That is, density measured in terms of grams per mL of the finished carbon molecular sieves is dependent on the density of the initial uncarbonized polymer and the carbonization process conditions.

The carbon molecular sieves of the invention as produced are hydrophobic rather than hydrophilic and thus do not preferentially adsorb water which may be present in natural gas.

Activation

The term "activation" has been used in connection with processes intended to improve the adsorptive capacity of carbons and will be used in the present discussion to avoid confusion. However, the term "activation" often refers to the chemical treatment of a solid to change its active form, as in the activation of catalyst precursors. In the present instance, "activation" is considered to be the removal of a portion of the carbon which increases the total pore volume of particles and the size of the pores. Thus, it might be more properly termed an adjustment or optimization of the pores rather than a change of the chemical nature of the carbon.

When a precursor material is carbonized, the pores formed may not be the most desirable size and the total pore volume of a particle may be less than the maximum possible. Ideally, one would want to achieve the largest pore volume consistent with the necessary structural integrity. The pores themselves should have a size which provides the maximum adsorptive capacity. This could be a single size or a distribution of pore sizes which accommodates the maximum amount of the gas to be stored.

Quinn et al. (U.S. Pat. No. 5,071,820) say that for storage of methane the pore size should be 10-15 Å (1-1.5 nm). The present inventors believe that the optimum size for the pores of their carbon molecular sieves will be between 4 and 12 Å (0.4-1.2 nm). In carbons made from polyvinylidene chloride the pore size range is very narrow, that is, about 4-6 Å (0.4-0.6 nm). It has been found that the capacity for methane storage is significantly increased if the pore size is enlarged. If for simplicity one considers the pores being gradually enlarged, then it will be intuitively recognized that the capacity of each pore will be increased until some limit is reached. At some point it would be expected that so much carbon would be removed that the structural integrity of the carbon would be lost and the carbon would collapse with a consequent loss of pore volume. However, another factor must be considered. The pores are understood to be more than containers for gaseous methane, they are considered to cause the methane molecules to be held within the pores in closer proximity than in the gas phase. It is this phenomenon which provides an advantage for the use of adsorbents such as carbon, otherwise one might as well simply use an empty container, which would have a larger capacity than when filled with carbon. This quasi-condensation of methane in the pores will have its maximum effect at some pore size. Matranga et al. in Chem. Eng. Sci., Vol. 47, No. 7, pp. 1569-1579 (1992) assume in their calculations that a width equal to two molecules of methane provides the optimum performance, or a pore size of about 11 Å (1.1 nm). It is apparent that whether or not their assumption is correct, that one would expect that the pore size could not be increased indefinitely without losing capacity for methane. If a method were available for increasing the pore size uniformly, it should be possible to identify for any given carbon the optimum pore size. However, since most carbons have non-uniform pores to some extent, it would be expected that the actual optimum for each carbon would have to be determined experimentally. In part, the optimum size may be affected by the larger meso and macro pores which are not considered to hold methane as effectively as the micropores, but may assist the gas in entering or leaving those pores.

Since in many cases, including the carbon molecular sieves of the inventors, it will be necessary to remove carbon to increase the size of the pores produced by the carbonization of the PVDC precursor polymer, gas phase reactions which can remove carbon are used. For example, steam, carbon dioxide, and oxygen have been suggested for this purpose. Each reaction produces carbon oxides, which are volatile and easily removed from the carbon. However, the location of the attack on the carbon is incompletely understood. For example, the reaction of carbon dioxide on the inventors carbon molecular sieves is to increase the pore volume in a non-linear manner. That is, the pore size distribution is broadened. It would be expected that a carbon having a wider distribution of pore sizes than that of the inventors carbon mole sieves would become even less well defined after undergoing an activation process. Thus, there is an advantage in beginning with a sharply defined pore size.

A process for activating carbon molecular sieves by removing carbon must involve a number of factors. As suggested above one would attempt to selectively increase the pore size so that the optimum total pore volume and pore size distribution is achieved. The temperature at which the reactive gas contacts the carbon will be of particular importance. Preferably the temperature will be at least 750° C. In some cases, it may be desirable to use staged temperatures where more than one contacting step is used. As with many chemical reactions the time at which the reactive gas is in contact with the carbon will have to be considered. The concentration of the reactive gas could be an important factor in determining the rate at which the carbon is removed. It may be desirable to vary the concentration during the process or it may be preferred to carry out the activation process in a series of steps so that the process can be more readily controlled. Activation of the pores in the inventors carbon mole sieves is possible in more than one variation and should not be limited to the specific processes described in the examples below. It has been found that activation can be carried out to optimize the pores of the carbon molecular sieves so that the amount of natural gas adsorbed at pressure and then delivered at 0 psig is maximized. This is contrary to the conclusion of some workers in the art.

EXAMPLE 1

This example illustrates the production of CMS pellets beginning with the bulk polymerization of a polyvinylidene chloride cross-linked with divinyl benzene. The monomers were purified by contact with activated carbon (Calgon PCB, 20×50 mesh) at the ratio of 2 grams activated carbon per 100 mL of the monomer and the divinyl benzene to remove any polymerization inhibitors. 0.1 gram of AIBN solids were introduced into a 125 mL Teflon-lined Parr bomb. 82.4 mL of vinylidene chloride monomer and 1 mL divinylbenzene were transferred into the reactor and the reactor was sealed and shaken. The reactor was then kept in an oven at 70° C. for at least 8 hours. Then, the polymer products were collected and weighed. The yield of polymerization reaction product was determined after the polymer was evacuated until a constant weight was obtained.

The polymer was then pulverized with an electric blender. Cylindrical pellets of 3.2 millimeter diameter and 3.2 mm height (aspect ratio 1/1) were made with a handpress.

A pellet was carbonized by heating in a one-inch diameter quartz tube placed in a tube furnace. A steady stream of nitrogen was introduced into the quartz tube for at least 30 minutes prior to the heating of the furnace. The temperature of the furnace was increased at 110° C. per hour to the final temperature of 900° C. and then held for one and one-half hours before the product was allowed to cool to room temperature.

EXAMPLE 2

This example illustrates the preparation of the polymer using solution polymerization. The same general procedure used in the Example 1 for the purification of the monomer and cross-linking agent were followed. A 125 mL Parr bomb as described in the previous example was filled to about 85 mL. The ratio of vinylidene chloride to solvent (orthodichlorobenzene) was maintained at 1:1.5. Divinyl benzene was included at 0.5 wt. % relative to the vinylidene chloride. The reactor was held at 70° C. for 21 hours. A polymer yield of 50.9 weight percent was obtained, with the solvent being removed from the polymer products by a vacuum ($10^{-3}$ mm mercury $1.33\times10^{-4}$ kPa absolute) until a constant weight was obtained. The material was then pulverized, shaped and carbonized as described in Example 1.

EXAMPLE 3

Polymers were produced using emulsion polymerization techniques. 43.7 grams of vinylidene chloride was mixed with 0.9 g of divinylbenzene cross-linking agent. Both of these materials had been purified as previously described in Example 1. The mixture was added to 137.8 g of a mixture containing 1.35 g of ammonium sulfate, 0.67 g of hydrazine sulfate, 0.81 g of sodium hydroxide and 135 g of distilled water which formed the continuous phase during the polymerization. 0.45 g of sodium lauryl sulfate was added to aid in formation of the emulsion. This admixture was maintained in a rapidly agitated 500 mL reactor maintained at a temperature of 25° C. for 24 hours. The polymer was recovered and then pulverized, pressed into pellets and carbonized following the procedure described for Example 1.

EXAMPLE 4

In another preparation a carbon molecular sieve was made by suspension polymerization using only vinylidene chloride (VDC). 140.6 g of commercial grade VDC (PPG Industries, Inc.) were passed through 40 mL of PCB activated carbon to remove the inhibitor content. Then 0.141 g of azobisisobutytonitrile (AIBN) was dissolved in the VDC. The VDC was then slowly added to 703.03 g of an aqueous solution containing 0.6% hydropropyl methyl cellulose and agitation of a 1000 mL Parr reactor was begun 10-100 rpm. The vessel containing the mixture was held in a constant temperature bath at 70° C. for about 8 hours, to complete the polymerization of VDC. The polymer was produced as spherical beads of about 2 mm diameter. These were recovered, washed with water, and dried at 100° C. The VDC polymer was carbonized either as produced or else ground to about 100 μm and then pelletized to about 3.2 mm diameter and 3.2 mm height. Samples of the polymer were carbonized in a flowing stream of nitrogen. The temperature was raised from 25° to 175° in 30 min. to 2 hours and held for 2–4 hours. It was then increased at a rate of 100° C. per hour to 700° C. and held for 2 hours before the product was allowed to cool to room temperature.

EXAMPLE 5

In testing of adsorbent particles the distribution of volume in a packed vessel was determined by the following method. The individual density of the particles ("piece density") was measured by weighing a particle and then dividing that weight by the volume of the particle. Assuming the density of the carbon itself is 2.2 g/mL, the total pore volume of the particle was calculated. The packing density was measured by placing about 10–30 grams of the particles in a 50 mL graduated cylinder and vibrating the cylinder with an electric vibrator (60 cycles/sec) until a constant volume was obtained. The interparticle void volume was then calculated, knowing the particle density and the packing density. The volume of the micropores was measured with Micromeritics ASAP 2000 micropore equipment using methane adsorption at 87.3° K. The pore size distribution was analyzed with a Horvath-Kawazoe method. It was found that the micropores of the carbonized polymer were generally in the region of 5–7 Å (0.5–0.7 nm). Using this information the volume of the pores in the meso pore range and of larger size were calculated by difference from the total pore volume. Photo micrographs have shown that the micro pores are very uniform and elongated in a slit-like configuration.

The results of measurements and calculations have shown that the distribution of space inside a storage vessel packed with carbon particles according to the present invention is different from that found with other carbon adsorbents. The following table provides comparative data.

TABLE A

| STORAGE VESSEL UTILIZATION | | | | |
|---|---|---|---|---|
| | Volume Distribution (Volume %) | | | Micro pore |
| Carbon Adsorbent | Carbon | Void | Macro + Meso Pores | Micro pores | % of Total Particle Pore Volume |
| ASRT-CMS[1] | 28.5 | 34.0 | 8.8 | 28.7 | 76.5 |
| ASRT CMS[2] | 32.1 | 35.3 | 2.6 | 30.0 | 92.0 |
| ASRT CMS[3] Disks | 46.0 | 3.3 | 6.8 | 43.9 | 86.6 |
| Calgon BPL[4] | 23.0 | 37.0 | 23.0 | 17.0 | 42.5 |
| Anderson AX-21[4] | 14.0 | 33.0 | 37.0 | 16.0 | 30.2 |
| Saran B | 38.0 | 7.0 | 23.0 | 32.0 | 58.2 |

TABLE A-continued

| STORAGE VESSEL UTILIZATION | | | | |
|---|---|---|---|---|
| | Volume Distribution (Volume %) | | | Micro pore |
| Carbon Adsorbent | Carbon | Void | Macro + Meso Pores | Micro pores | % of Total Particle Pore Volume |
| Carbon[4] Disk-shaped pieces | | | | | |

[1] Carbonized PVDC pellets 6–10 mesh, piece density 0.959 g/mL, packing density 0.633 g/mL
[2] Carbonized PVDC pellets 8–10 mesh, piece density 1.103 g/mL, packing density 0.714 g/mL
[3] Carbonized PVDC disks 2.21 cm. diameter × 0.685 cm. thick, piece density 1.057 g/mL, packing density 1.022 g/mL
[4] S. S. Barton, J. A. Holland and D. F. Quinn, "The Development of Adsorbent Carbon for the Storage of Compressed Natural Gas", Ontario Ministry of Energy Report No. AF-85-01, May, 1985. Calgon BPL is an activated carbon produced by Calgon, Anderson AX-21 is a highly activated carbon produced by Anderson Carbon, and Saran B is a carbon disk prepared from Saran polymers by the Royal Military College of Canada.

It can be seen that, compared to other carbons, the carbon molecular sieves of the invention have a larger fraction of micropores (0.4 nm to 2.0 nm, preferably at least 60% of the total pore volume of each particle, which are considered most important in achieving a high capacity for natural gas. It can also be seen that disks formed of carbon would be a preferred shape since the void volume is substantially reduced. However, the advantage of the carbon molecular sieves of the invention is in the larger volume of micropores in each particle, regardless of the shape used.

EXAMPLE 6

Measurement of the methane capacity of the carbon pellets of Example 1 was carried out in quartz or stainless steel containers having volumes of 40, 46, and 80 mL. The pellets were packed into the container using an electric vibrator to obtain the maximum packing density. The container was evacuated to 1 m torr (0.001 mm Hg) and heated to 175° C. for 4 hours. After cooling to room temperature, the weight of the container and contents was measured and then methane gas was introduced at various pressures. The temperature was measured by a thermocouple placed in the center of the bed of pellets. After equilibrium was reached, the container was weighed again and the total methane uptake determined. This includes methane in the micropores, the meso and macro pores, and the void space between pellets.

Some data taken by the above method which compare carbon molecular sieves of the invention with some commercially available carbons are given in the following table.

TABLE B

| | Norit Carbon[1] | | | PCB-20x50[2] | | | ASRT CMS[3] | | | Bergbau-Forschung[4] CMS | | | Saran Carbon[5] | |
|---|---|---|---|---|---|---|---|---|---|---|---|---|---|---|
| | | | | | | | | | | | | | (Dacey) | (Barton) |
| Cell Volume | 81.0 | | | 81.0 | | | 81.0 | | | 81.0 | | | | |
| Wt - packed | 32.42 | | | 39.43 | | | 42.53 | | | 57.87 | | | | |
| dried | 31.37 | | | 36.08 | | | 40.95 | | | 57.00 | | | | |
| Packing Density | 0.387 | | | 0.445 | | | 0.506 | | | 0.704 | | | 0.32 | |
| Methane Uptake Pressure | wt. | (g/g)' | (g/g) | wt. | (g/g)' | (g/g) | wt. | (g/g)' | (g/g) | wt. | (g/g)' | (g/g) | (g/g) | (g/g) |
| 100 psig (70.6 kPa abs.) | 2.17 | 0.0677 | 0.05887 | 2.42 | 0.0671 | 0.0599 | 3.25 | 0.0790 | 0.0737 | 2.39 | 0.0419 | 0.0382 | | |
| 200 psig (1,479 kPa abs.) | 2.94 | 0.0937 | 0.0767 | 3.27 | 0.0906 | 0.0770 | 4.03 | 0.0984 | 0.0880 | 2.97 | 0.0521 | 0.0449 | | |
| 300 psig (2,169 kPa abs.) | 3.57 | 0.1138 | 0.0862 | 3.94 | 0.1095 | 0.0888 | 4.61 | 0.1126 | 0.0963 | 3.41 | 0.0598 | 0.0487 | 0.087 | 0.070 |

TABLE B-continued

|  | Norit Carbon[1] | PCB-20x50[2] | ASRT CMS[3] | Bergbau-Forschung[4] CMS | Saran Carbon[5] (Dacey) | (Barton) |
|---|---|---|---|---|---|---|
| $(V/V)_{300}$ | 68 | 76 | 88 | 65 | 51 | |

[1]Norit Carbon is an activated carbon produced by American Norit Co., Inc.
[2]PCB-20x50 is an activated carbon produced by Calgon.
[3]ASRT CMS is a carbon molecular sieve produced by a cross-linked PVDC polymer according to the invention.
[4]Bergbau-Forschung is a carbon molecular sieve produced by Bergbau-forschung.
[5]From S. S. Barton et al., "High Pressure Adsorption of Methane on Porous Carbons", "Fundamentals of Adsorption", 1st Engineering Foundation Conference, 1984, p. 65.

The values of (g/g)' represent the total methane uptake per gram of carbon, while the values of (g/g) give the capacity of the micropores of the carbon. The total volume of the methane stored at pressure is given as $(v/v)_{300}$. It is calculated by the formula $(v/v)_{300}$ = (total $CH_4$ stored at 300 psig or 2,169 kPa abs.)÷0.000643 g/mL÷cell volume where 0.000643 g/mL is the density of $CH_4$ at delivery conditions (29.40 in. Hg or 746 mm Hg, 26.3° C.).

It can be seen that the carbon molecular sieve of the invention has a higher capacity for methane storage than activated carbons or the commercial carbon molecular sieves which were tested.

EXAMPLE 7

The measurements of Example 6 were made on carbon molecular sieves prepared as in Examples 1 and 4. They are compared below, along with another carbon molecular sieve made as in Example 4 but in a larger scale preparation. The results are presented in the table below.

TABLE C

| Preparation Method | Packing Density (g/mL) | Storage Temp. (°C.) | Storage Capacity at 300 psig | | |
|---|---|---|---|---|---|
| | | | $(g/g)'_{300}$ | $(g/g)_{300}$ | $(V/V)_{300}$ |
| Example 1 | 0.506 | 25 | 0.1126 | 0.0963 | 88 |
| Example 4 | 0.629 | 24 | 0.1100 | 0.0995 | 106 |
| Example 4 | 0.692 | 24 | 0.1076 | 0.0992 | 114 |
| Example 4 scale-up | 0.633 | 4 | 0.1132 | 0.1031 | 109 |
| Example 4 scale-up | 0.629 | 25 | 0.1101 | 0.0996 | 106 |
| Example 4 scale-up | 0.683 | 25 | 0.1103 | 0.1018 | 115 |
| Example 4 scale-up | 0.697 | 25 | 0.1090 | 0.1008 | 116 |
| Example 4 scale-up | 1.022 (disk) | 25 | 0.0995 | 0.0978 | 158 |
| Example 4 scale-up | 0.575 | 27 | 0.1111 | 0.0984 | 99 |

All of the samples were carbonized pellets except for the one sample in the form of disks which more effectively uses the space available in the test vessel. The above results may be compared with more conventional carbon adsorbents shown in the table below.

TABLE D

| Carbon Absorbent | Packing Density g/mL | Storage Temp. (°C.) | Storage Capacity at 300 psig | | |
|---|---|---|---|---|---|
| | | | $(g/g)'_{300}$ | $(g/g)_{300}$ | $(V/V)_{300}$ |
| Norit Carbon[1] | 0.387 | 24 | 0.1138 | 0.0882 | 68 |
| Calgon PCB-1[2] | 0.445 | 23 | 0.1095 | 0.0888 | 76 |
| Calgon PCB-2[3] | 0.500 | 27 | 0.1018 | 0.0845 | 79 |
| Nuchar WV-B[3] | 0.259 | 25 | 0.1142 | 0.0690 | 46 |
| Anderson AX-21[4] | 0.355 | 25 | 0.1569 | 0.1305 | 87 |
| Saran[5] Carbon | 0.320 | 25 | — | 0.070 | 51 |

[1]Norit Carbon is an activated carbon produced by American Norit Co., Inc.
[2]Calgon PCB-1 is an activated carbon produced by Calgon.
Calgon PCB-2 is an activated carbon produced by Calgon.
[3]Nuchar WV-B is an activated carbon produced by Westvaco.
[4]Anderson AX-1 is an activated carbon produced by Anderson Development Co.
[5]Barton et al. "High Pressure Adsorption of Methane on Porous Carbons" Fundamental of Adsorption, 1st Engineering Foundation Conference, 1984, p. 65

EXAMPLE 8

A sample of 2 mm diameter beads of a carbon molecular sieve made by the procedures of Example 4 was tested for its adsorption of water from air having various amounts of water vapor. The results are given in the following table.

TABLE E

| Water Loading, g/g | % Relative Humidity |
|---|---|
| 0 | 0 |
| 0.002 | 20 |
| 0.014 | 40 |
| 0.030 | 60 |

It will be evident that adsorption of water should be avoided since water vapor would reduce the capacity of the carbon molecular sieve for methane. Conventional carbons which are not hydrophobic show a much greater capacity for water with increasing humidity.

EXAMPLE 9

Polymer pellets produced by the process of Example 4 were carbonized by heating in $N_2$ or $CO_2$. The programmed heating, the inert gas used, and the results are shown in the following table.

TABLE F

| Sample # | Gas | Program Heating Rate (°C./hr) at 140–180° C. | Carbonization Maximum Temperature (°C.) | Time (h) | Carbon Yield (%) | Piece Density (g/mL) | $CH_4$ BET Surface Area $(m^2/g)$ | Micropore Volume (mL/g) |
|---|---|---|---|---|---|---|---|---|
| 1 | $N_2$ | 100 | 705 | 2.0 | 25.454 | 0.607 ± 0.218 | 1397 | 0.442 |
| 2 | $N_2$ | 25 | 700 | 2.0 | 25.698 | 0.968 ± 0.055 | 1298 | 0.429 |
| 3 | $N_2$ | 2 | 700 | 2.0 | 25.701 | 1.023 ± 0.055 | 1337 | 0.422 |
| 4 | $N_2$ | 2 | 711 | 2.0 | 25.625 | 0.994 ± 0.043 | 1349 | 0.426 |
| 5 | $CO_2$ | 2 | 709 | 2.0 | 25.068 | 0.990 ± 0.049 | 1373 | 0.427 |
| 6 | $CO_2$ | 2 | 854 | 2.0 | 21.349 | 0.847 ± 0.078 | 2145 | 0.650 |
| 7 | $CO_2$ | 2 | 802 | 2.25 | 22.829 | 0.912 ± 0.076 | 1800 | 0.544 |

TABLE F-continued

| Sample # | Gas | Program Heating Rate (°C./hr) at 140-180° C. | Carbonization Maximum Temperature (°C.) | Time (h) | Carbon Yield (%) | Piece Density (g/mL) | CH₄ BET Surface Area (m²/g) | Micropore Volume (mL/g) |
|---|---|---|---|---|---|---|---|---|
| 8 | $CO_2$ | 3 | 781 | 0.25 | 24.395 | 0.956 ± 0.039 | 1366 | 0.418 |
| 9 | $CO_2$ | 3 | 785 | 0.25 | 24.521 | 0.929 ± 0.046 | 1706 | 0.523 |
| 10 | $CO_2$ | 3 | 795 | 2.0 | 22.974 | 0.896 ± 0.046 | 1784 | 0.549 |
| 11 | $CO_2$ | 4 | 790 | 2.0 | 23.297 | 0.917 ± 0.033 | 1757 | 0.538 |
| 12 | $CO_2$ | 6 | 789 | 2.0 | 23.096 | 0.868 ± 0.031 | 1606 | 0.498 |
| 13 | $CO_2$ | 1 | 798 | 6.0 | 21.523 | 0.865 ± 0.078 | 1787 | 0.551 |

The results of samples 1–4 suggest that rapid heating of the polymer pellets in the range of 140°–180° C., where PVDC is known to begin decomposing, provides a lower density product and thus heating in that temperature range should be slower in order to increase the particle (piece) density, which will increase the amount of carbon which can be stored in a given container. Interestingly, the change in heating rate does not appear to significantly affect the surface area or the micropore volume.

The result of Sample 5 shows that the use of $CO_2$ as the purging gas has no effect on the surface area or micropore volume when the carbonization is done with a maximum temperature of about 700°–710° C. However, increasing the maximum carbonization temperature (Samples 6–13) provides an increase in surface area and micropore volume, with some decrease in piece density. It appears that an activation effect is obtained.

EXAMPLE 10

Several methods of activating carbon molecular sieves were compared, with the results shown in the following table. In each case the polymer precursor was prepared using the suspension polymerization described in Example 4 and carbonized by the procedure described in Example 4. For the steam activation, a stream of $N_2$ passed through a water evaporator heated at 75° C. This $N_2$ containing $H_2O$ vapor was sent to the quartz reactor containing the carbon molecular sieve while the carbon sample was heated at 825° C. For $CO_2$ activation, a pure (100%) $CO_2$ was used with a carbon sieve temperature of 800° C.

TABLE G

| Sample | Activating Gas | Activation Conditions | Yield after Activation | Packing Density, g/mL | BET Surface Area m²/gm | Micropore Volume, mL/gm |
|---|---|---|---|---|---|---|
| 14 | None (base) | None | 100 | 0.633 | 1484 | 0.45 |
| 15 | Steam | 825° C. | 65.8 | 0.435 | 1861 | 0.56 |
| 16 | $CO_2$ | 800° C. | 73 | 0.469 | 1864 | 0.56 |

It can be seen that the result of removing carbon from the carbon molecular sieve by reaction with steam or $CO_2$ reduces the packing density since there is less carbon present. Also, the surface area and micropore volume are increased as the pores are enlarged.

EXAMPLE 11

The effect of activating carbon molecular sieves is to increase the stored and deliverable amount of natural gas, resulting from the increase in micropore volume. The carbon molecular sieves were produced by carbonizing in nitrogen at a maximum temperature of 700° C. the polymer precursors made by the suspension polymerization process described in Example 4. The activation conditions are given along with the capacity for methane in the following table.

TABLE H

| Sample | Particle Form | Activating Gas | Activating Conditions | Carbon Yield % | Packing Density, g/mL | (g/g)₀ | (g/g)₃₀₀ | (v/v)₃₀₀ | Δ(v/v) |
|---|---|---|---|---|---|---|---|---|---|
| 17 | 2.3 mm Pellet | None (base) | N/A | 100 | 0.633 | 0.0300 | 0.1031 | 111.53 | 81.50 |
| 18 | 2.3 mm Pellet | $CO_2$ | 800° C. 9 hr. | 77.3 | 0.545 | 0.0319 | 0.133 | 122.2 | 94.6 |
| 19 | 2.3 mm Pellet | $CO_2$ | 800° C. 11.2 hr. | 70.3 | 0.544 | 0.0304 | 0.1401 | 127.62 | 101.36 |
| 20 | 2.3 mm Pellet | Steam | 825° C. 67 min. | 68.5 | 0.492 | 0.0247 | 0.1363 | 114.82 | 95.29 |
| 21 | Disk | None (base) | N/A | 100 | 1.022 | 0.0300 | 0.1001 | 158 | 110.80 |
| 22 | Disk | $CO_2$ | 800° C. 14.5 hrs. | 77.1 | 0.837 | 0.0277 | 0.1334 | 173.20 | 137.20 |

The disks (samples 21,22) were compressed powdered carbon molecular sieves with a diameter of 21 mm and a thickness of 6.5 mm. By minimizing void space between the particles, these disks provide a higher storage capacity based on volume than do the pellets of samples 17–20. It will be seen that the activation process, although it removes carbon, provides improved storage capacity. However, there is an optimum activation, as will be seen.

EXAMPLE 12

Two samples of carbon molecular sieves were measured by methane adsorption at 87.3° K. as previously discussed to determine the size and distribution of the micropores. Both samples had been prepared by carbonizing PVDC polymer made by the suspension polymerization method described in Example 4. They were carbonized by heating in nitrogen to 700° C. for 2 hours. One sample was measured as produced, while the second was activated by reacting it with $CO_2$ for 7 hrs. at 800° C.

As carbonized, the carbon molecular sieves have a pore diameter of about 5–6 Å (0.5–0.6 nm) with only a minor portion of the pores being larger. However, the activated carbon molecular sieve has a major portion of the micropore volume in the region above 6 Å (0.6 nm).

EXAMPLE 13

To determine whether an optimum pore size and distribution can be expected when carbon molecular sieves are activated to increase the micropore volume, 5 samples of PVDC precursor polymer produced using the suspension polymerization method described in Example 4 were carbonized by heating in nitrogen at 700° C. for 2 hrs. Then, samples were given activation treatments with $CO_2$ at varying temperatures and times to increase the total pore volume. The samples were tested for methane capacity as described previously.

As the severity of the activation is increased, the carbon yield goes down (carbon is oxidized and removed). At the same time the methane loading at the discharge pressure decreases rather than increasing as might be expected since there is less carbon present and the space available to hold methane at discharge pressure has increased. However, it is found that the $\Delta(v/v)$, that is, the amount of methane discharged increases until 60-70% of the initial carbon remains, after which the ability of the carbon to deliver methane begins to drop off. The capacity of the carbon at pressure $(v/v)_{300}$ [the sum of $(v/v)_0$ and $\Delta(v/v)$] also increases to a maximum and then decreases. Consequently, it is believed that the increase of the pore size resulting from the activation procedure has provided a larger capacity for methane, but only insofar as the pores do not become so large that the density of the methane is reduced.

EXAMPLE 14

361.31 g of PVDC beads produced by suspension polymerization as described in Example 4 were heated at 80° C. and held under a vacuum of 8.7 mm Hg (1.16 kPa) for 1 hour to remove volatiles. The beads were then cooled to 10° C. under vacuum. A solution of vinylidene chloride containing AIBN initiator (164.49 g VDC; 0.16 g AIBN) was slowly added to the beads. After this impregnation of the beads, they were transferred to a 1-liter autoclave and covered with distilled water saturated with VDC. The mixture was heated to about 75° C. under a $N_2$ pressure of 300 psig (2068 kPa gauge) for 8 hours to polymerize the added VDC. The autoclave was stirred at 60 rpm. After the reaction was complete the beads were recovered and dried. Several impregnation/polymerization cycles were carried out and the packing density measured as previously described. The results are shown in the following table.

TABLE I

| Number of Impregnations | Packing Density, g/mL |
|---|---|
| Base | 0.840 |
| 1 | 0.935 |
| 1 | 0.939 |
| 2 | 1.018 |
| 3 | 1.040 |

EXAMPLE 15

The beads produced in Example 14 were carbonized in a flow of helium as previously described. The temperature was raised from 25° to 175° C. over 30 minutes and then held for 4 hours. It was then increased from 175° to 210° C. over 3.5 hours and held there for 2 hours. A further increase to 700° C. was carried out at 100° C./hr and the maximum temperature was maintained for 2 hours before cooling to the room temperature. The carbon was about 25-26% of the original weight of the beads. The packing density was measured and is reported in the following table.

TABLE J

| No. of Impregnations | Packing Density, g/mL Before Carbonization | After Carbonization | Density Retention, % |
|---|---|---|---|
| 0 | 0.840 | 0.59 | 70.2 |
| 1 | 0.939 | 0.668 | 71.1 |
| 1 | 0.935 | 0.674 | 72.1 |
| 1 | 0.935 | 0.672 | 71.9 |
| 2 | 1.018 | 0.709 | 69.7 |
| 2 | 1.018 | 0.702 | 69.0 |
| 3 | 1.040 | 0.700 | 67.3 |

It can be seen that the density retention is about the same but the actual density is much higher for those beads which had been impregnated with additional VDC monomer.

EXAMPLE 16

The carbonized beads from Example 15 were activated by treatment with $CO_2$ at 800° C. for 3-9 hours. The storage capacity was measured as described in Example 6 and compared with non-impregnated beads in the following table.

TABLE K

| No. of Impregnations | Packing Density, g/mL After Carbonization | After Activation | $(g/g)_o$ | $(g/g)_{300}$ | $(v/v)_{300}$ | $\Delta(v/v)_{300}$ |
|---|---|---|---|---|---|---|
| 0 | 0.59 | 0.478 | 0.0359 | 0.1356 | 111.79 | 84.52 |
| 1 | 0.674 | 0.483 | 0.0291 | 0.1487 | 118.18 | 96.48 |
| 1 | 0.674 | 0.520 | 0.0306 | 0.1428 | 122.44 | 97.64 |
| 1 | 0.674 | 0.581 | 0.0320 | 0.1398 | 122.18 | 93.66 |
| 2 | 0.709 | 0.473 | 0.0287 | 0.1533 | 120.89 | 99.58 |
| 2 | 0.702 | 0.473 | 0.0285 | 0.1481 | 118.84 | 97.37 |
| 2 | 0.702 | 0.499 | 0.0288 | 0.1454 | 122.05 | 99.23 |

EXAMPLE 17

The beads activated in Example 16 were combined with pellets similar to Sample 19 in Table H to form a high packing density system (0.666 g/mL). The capacity of this system for methane storage was measured and compared to a system containing only the pellets and to a competing activated carbon (AX-21 Anderson Carbon). The deliverable methane capacity ($\Delta v/v$) at various storage pressures is compared in the following table.

TABLE L

| Storage Pressure, psig (kPa gauge) | Δ(v/v) AX-21 | Pellets | Pellet & Beads |
|---|---|---|---|
| 0 (6.895) | 0 | 0 | 0 |
| 100 (689.5) | 38 | 60 | 75 |
| 200 (1378.9) | 60 | 86 | 106 |
| 300 (2068.4) | 76 | 105 | 126 |
| 400 (2757.2) | 87 | 119 | 142 |
| 500 (3308.6) | 100 | 140 | 155 |
| 600 (3970.3) | 110 | 129 | 165 |
| 700 (4632) | 120 | 148 | 175 |
| 800 (5293.8) | 130 | 155 | 180 |
| 900 (5955.5) | 138 | 160 | 185 |

The data indicate that the beads having a higher packing density resulting from the impregnation/polymerization of additional VDC monomer provides a significant increase in the deliverable methane.

We claim:

1. In the method of preparing a carbon molecular sieve by carbonizing a precursor polyvinylidene chloride polymer the improvement comprising impregnating said precursor polymer with additional vinylidene chloride monomer from which said polymer was derived and polymerizing said monomer to increase the density of said precursor polymer and the resulting carbon molecular sieve.

2. The method of claim 1 wherein the precursor polymer density is increased up to about 125%.

3. The method of claim 1 wherein said precursor polymer is free of a crosslinking agent.

4. The method of claim 3 wherein said precursor polymer is prepared by suspension polymerization of vinylidene chloride.

* * * * *